United States Patent
Kanai et al.

(10) Patent No.: US 12,050,680 B2
(45) Date of Patent: Jul. 30, 2024

(54) ANOMALY DETECTION APPARATUS, ANOMALY DETECTION METHOD, AND NON-TRANSITORY STORAGE MEDIUM

(71) Applicant: KABUSHIKI KAISHA TOSHIBA, Tokyo (JP)

(72) Inventors: Jun Kanai, Inagi (JP); Hiroyoshi Haruki, Kawasaki (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 443 days.

(21) Appl. No.: 17/465,086

(22) Filed: Sep. 2, 2021

(65) Prior Publication Data
US 2022/0188401 A1    Jun. 16, 2022

(30) Foreign Application Priority Data
Dec. 14, 2020    (JP) .................. 2020-206912

(51) Int. Cl.
*G06F 21/50*    (2013.01)
*G05B 23/02*    (2006.01)
*H04L 9/40*    (2022.01)
*G06N 20/00*    (2019.01)

(52) U.S. Cl.
CPC .......... *G06F 21/50* (2013.01); *G05B 23/0213* (2013.01); *H04L 63/02* (2013.01); *H04L 63/1425* (2013.01); *G06N 20/00* (2019.01)

(58) Field of Classification Search
CPC ..... G06F 21/50; G05B 23/0213; H04L 63/02; H04L 63/1425; G06N 20/00
See application file for complete search history.

(56) References Cited

U.S. PATENT DOCUMENTS

| 11,012,409 B2 | 5/2021 | Yang et al. |
| 2015/0058502 A1* | 2/2015 | Seki ............ G05B 19/05 710/19 |
| 2020/0103883 A1* | 4/2020 | Kishi ............ G05B 23/0243 |

(Continued)

FOREIGN PATENT DOCUMENTS

| JP | 2006-235677 A | 9/2006 |
| JP | 2019-45905 A | 3/2019 |

(Continued)

*Primary Examiner* — Stephen T Gundry
(74) *Attorney, Agent, or Firm* — Oblon, McClelland, Maier & Neustadt, L.L.P.

(57) ABSTRACT

One embodiment of the present invention provides an apparatus, or the like, which detects an anomaly of a controller of a control system by learning relationship between input and output of the controller. An anomaly detection apparatus which is one embodiment of the present invention includes a first acquirer, a second acquirer, a history recorder, an estimator, and a first anomaly determiner. The first acquirer acquires an input signal to a control apparatus which executes control on a controlled apparatus. The second acquirer acquires an output signal from the control apparatus. The history recorder records information regarding the acquired input signal and the acquired output signal as history. The estimator estimates the output signal using the history and an estimation model. The first anomaly determiner determines an anomaly of the control apparatus by comparing the estimated output signal with the acquired output signal.

8 Claims, 11 Drawing Sheets

(56) References Cited

U.S. PATENT DOCUMENTS

| | | | | |
|---|---|---|---|---|
| 2021/0109833 A1* | 4/2021 | Petladwala | ......... | G06F 11/3409 |
| 2022/0004177 A1* | 1/2022 | Kurokawa | ......... | G05B 23/0254 |
| 2022/0156137 A1* | 5/2022 | Yoshida | ............. | G06F 11/3447 |
| 2022/0164812 A1* | 5/2022 | Takahashi | .............. | G06Q 30/02 |
| 2022/0171376 A1* | 6/2022 | Kim | ................ | G05B 19/41885 |
| 2022/0172047 A1* | 6/2022 | Aoki | ...................... | G06N 5/022 |
| 2022/0172068 A1* | 6/2022 | Kim | ...................... | G06N 3/088 |
| 2022/0222402 A1* | 7/2022 | Okawachi | ............. | G06N 20/10 |
| 2022/0224574 A1* | 7/2022 | Kataoka | ............... | G05B 19/058 |
| 2022/0263689 A1* | 8/2022 | Kataoka | ............. | H04L 25/0262 |
| 2022/0309354 A1* | 9/2022 | Yoon | ...................... | G06N 3/045 |
| 2022/0342380 A1* | 10/2022 | Fujimura | ............ | G05B 19/058 |
| 2022/0357730 A1* | 11/2022 | Satoh | ................... | G05B 23/024 |
| 2022/0365621 A1* | 11/2022 | Maeyama | ................. | G06F 3/03 |
| 2022/0383194 A1* | 12/2022 | Idesawa | ................ | G06N 20/00 |
| 2022/0385317 A1* | 12/2022 | Jung | ........................ | H03F 1/30 |
| 2022/0394146 A1* | 12/2022 | Kitagawa | ............... | G03G 21/00 |
| 2023/0176532 A1* | 6/2023 | Tsuneki | ................ | G05B 11/36 |
| | | | | 700/28 |
| 2023/0324885 A1* | 10/2023 | Tsuneki | ............ | G05B 19/4155 |
| | | | | 700/28 |
| 2023/0376727 A1* | 11/2023 | Kubosawa | ............. | G06F 30/27 |

FOREIGN PATENT DOCUMENTS

| | | | |
|---|---|---|---|
| JP | 2019-185468 | A | 10/2019 |
| JP | 2019-208199 | A | 12/2019 |
| JP | 2020-140573 | A | 9/2020 |
| JP | 2020-197967 | A | 12/2020 |

* cited by examiner

| INPUT/OUTPUT TIME | PREVIOUS INTERVAL | PREVIOUS FLAG | TYPE | ADDRESS/PORT | INPUT/OUTPUT VALUE |
|---|---|---|---|---|---|
| 10:00:00 | --- | No | Packet(write) | 100 | 1 |
| 10:00:01 | NO DATA | UNDETERMINED | AO | 1 | 1.1 |
| 10:00:01 | --- | No | INTERNAL INFORMATION | 12345 | 100 |
| 10:00:03 | --- | No | Packet(write) | 101 | 1 |
| 10:00:04 | NO DATA | UNDETERMINED | DO | 2 | 1 |
| 10:00:11 | 00:00:10 | UNDETERMINED | AO | 1 | 1.1 |
| 10:00:12 | --- | No | INTERNAL INFORMATION | 12345 | 200 |
| 10:00:12 | --- | No | Packet(write) | 100 | 2 |
| 10:00:21 | 00:00:10 | UNDETERMINED | AO | 1 | 2.2 |
| 10:00:21 | --- | No | INTERNAL INFORMATION | 12345 | 200 |
| 10:00:23 | --- | No | Packet(write) | 101 | 0 |
| 10:00:24 | 00:00:20 | UNDETERMINED | DO | 2 | 0 |
| 10:00:25 | --- | No | Packet(write) | 101 | 1 |
| 10:00:26 | 00:00:02 | UNDETERMINED | DO | 2 | 1 |

FIG. 4

| INPUT/OUTPUT TIME | PREVIOUS INTERVAL | PERIODIC FLAG | TYPE | ADDRESS/PORT | INPUT/OUTPUT VALUE |
|---|---|---|---|---|---|
| 10:00:00 | --- | No | Packet(write) | 100 | 1 |
| 10:00:01 | NO DATA | Yes | AO | 1 | 1.1 |
| 10:00:01 | --- | No | INTERNAL INFORMATION | 12345 | 100 |
| 10:00:03 | --- | No | Packet(write) | 101 | 1 |
| 10:00:04 | NO DATA | No | DO | 2 | 1 |
| 10:00:11 | 00:00:10 | Yes | AO | 1 | 1.1 |
| 10:00:12 | --- | No | INTERNAL INFORMATION | 12345 | 200 |
| 10:00:12 | --- | No | Packet(write) | 100 | 2 |
| 10:00:21 | 00:00:10 | Yes | AO | 1 | 2.2 |
| 10:00:21 | --- | No | INTERNAL INFORMATION | 12345 | 200 |
| 10:00:23 | --- | No | Packet(write) | 101 | 0 |
| 10:00:24 | 00:00:20 | No | DO | 2 | 0 |
| 10:00:25 | --- | No | Packet(write) | 101 | 1 |
| 10:00:26 | 00:00:02 | No | DO | 2 | 1 |

FIG. 5

| TYPE | ADDRESS/PORT | AVERAGE INTERVAL | ALLOWABLE ERROR |
|---|---|---|---|
| AO | 1 | 00:00:10 | 00:00:01 |
| DO | 3 | 00:01:00 | 00:00:06 |

| INPUT/OUTPUT TIME | PREVIOUS INTERVAL | PERIODIC FLAG | TYPE | ADDRESS/PORT | INPUT/OUTPUT VALUE |
|---|---|---|---|---|---|
| 10:00:00 | --- | No | AI | 1 | 1.1 |
| 10:00:01 | NO DATA | YES | Packet(read) | 22345 | 11 |
| 10:00:03 | --- | No | AI | 1 | 1.2 |
| 10:00:04 | --- | No | AI | 1 | 1.3 |
| 10:00:11 | 00:00:10 | YES | Packet(read) | 22345 | 13 |
| 10:00:12 | --- | No | AI | 1 | 1.0 |
| 10:00:21 | 00:00:10 | YES | Packet(read) | 22345 | 10 |
| 10:00:23 | --- | No | AI | 1 | 1.1 |
| 10:00:25 | --- | No | AI | 1 | 1.5 |

FIG. 11B

| TYPE | ADDRESS/PORT | AVERAGE INTERVAL | ALLOWABLE ERROR |
|---|---|---|---|
| Packet(write) | 22345 | 00:00:10 | 00:00:01 |

ANOMALY DETECTION APPARATUS, ANOMALY DETECTION METHOD, AND NON-TRANSITORY STORAGE MEDIUM

CROSS-REFERENCE TO RELATED APPLICATION (S)

This application is based upon and claims the benefit of priority from Japanese Patent Application No. 2020-206912, filed Dec. 14, 2020; the entire contents of which are incorporated herein by reference.

FIELD

Embodiments described herein relate generally to an anomaly detection apparatus, an anomaly detection method, and a non-transitory storage medium.

BACKGROUND

In recent years, cyberattacks aiming at control systems become common, and it is the urgent need to take security measures. As the security measures, an intrusion detection system (IDS) is commonly used in recent years. Most of the IDSs for control systems is an anomaly detection type IDS which learns packets flowing through a communication channel in a normal state and determines a state as an anomaly in a case where a packet deviating from a learning result flows.

However, it is necessary to take security measures other than a method of detecting an attack by monitoring a network. For example, there is also an attack which rewrites a program called ladder logic which operates at a controller such as a programmable logic controller (PLC) and a distributed control system (DCS) of a control system. Further, there is also an attack which rewrites firmware of a controller via a joint test action group (JTAG), or the like. Even if a controller has an anomaly by these attacks and improperly operates, it is difficult to detect these attacks by a current IDS.

BRIEF DESCRIPTION OF THE DRAWINGS

FIG. 4 is a view illustrating an example of history data;

FIG. 5 is a view illustrating history data after periodicity determination;

FIG. 6 is a view illustrating periodic data;

FIGS. 11A and 11B are views illustrating history data and periodic data when the state notification signal is acquired.

DETAILED DESCRIPTION

One embodiment of the present invention provides an apparatus, or the like, which detects an anomaly of a controller of a control system by learning relationship between input and output of the controller.

An anomaly detection apparatus which is one embodiment of the present invention includes a first acquirer, a second acquirer, a history recorder, an estimator, and a first anomaly determiner. The first acquirer acquires an input signal to a control apparatus which executes control on a controlled apparatus. The second acquirer acquires an output signal from the control apparatus. The history recorder records information regarding the acquired input signal and the acquired output signal as history. The estimator estimates an output signal at a time point after a time point relating to data based on the history which is input to an estimation model based on a neural network by inputting the data to the estimation model. The first anomaly determiner determines an anomaly of the control apparatus by comparing the estimated output signal with the acquired output signal.

An embodiment will be explained in detail below with reference to the accompanying drawings. The present invention is not limited to the embodiment.

One Embodiment of the Present Invention

Figure 1:
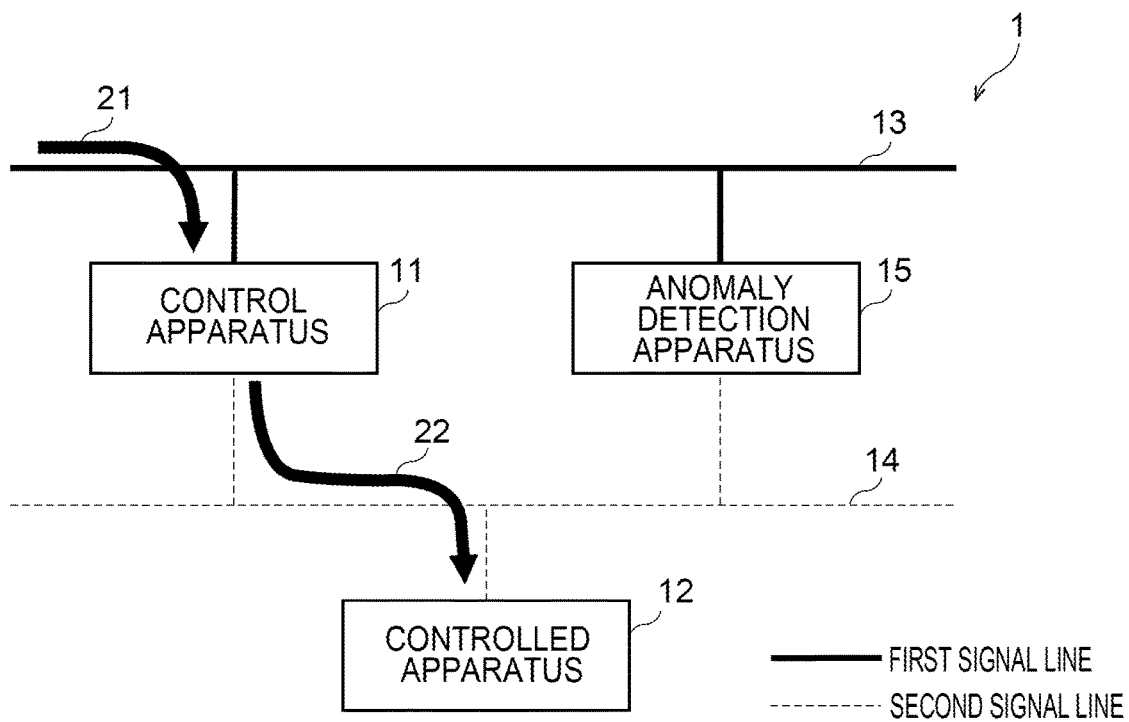
FIG. 1 is a block diagram illustrating an example of a control system according to one embodiment of the present invention.

FIG. 1 is a block diagram illustrating an example of a control system according to one embodiment of the present invention. A control system 1 according to the present embodiment includes a control apparatus 11, a controlled apparatus 12, a first signal line 13, a second signal line 14, and an anomaly detection apparatus 15.

The control apparatus 11, which is an apparatus controlling the controlled apparatus 12, is also referred to as a controller. The control apparatus 11 receives a signal regarding execution of control such as a control command and generates a signal indicating control to be performed on the basis of the signal. The control apparatus 11 then outputs the signal indicating the control to be performed to the controlled apparatus 12, and the controlled apparatus 12 operates on the basis of the signal. Hereinafter, the signal regarding execution of control, to be input to the control apparatus 11 will be described as a "control input signal". Further, the signal indicating the control to be performed, to be output from the control apparatus 11 will be described as a "control output signal".

Note that in a case where the control to be performed is determined in advance, the control input signal and the control output signal may be mere execution commands. Further, the control input signal and the control output signal may be communication signals such as packets or may be electrical signals such as analog input (AI), digital input (DI), analog output (AO) and digital output (DO).

The controlled apparatus 12 only requires to be an apparatus which can operate on the basis of the control output signal. Operation to be performed is not particularly limited.

FIG. 1 indicates the control input signal with an arrow 21 and indicates the control output signal with an arrow 22. In this manner, the first signal line 13 transmits the control input signal to the control apparatus 11, and the second signal line 14 transmits the control output signal to the controlled apparatus 12. Forms of the first signal line 13 and the second signal line 14 are not particularly limited if the signal lines can respectively transmit the control input signal and the control output signal. The first signal line 13 and the second signal line 14 may branch as illustrated in FIG. 1 and may be connected to apparatuses other than the control apparatus 11, such as the anomaly detection apparatus 15. Further, for example, in a case where the control input signal and the control output signal are communication signals, the first signal line 13 and the second signal line 14 may be Ethernet or serial buses such as RS-232 and RS-485. Further, in a case where the control input signal and the control output signal are electrical signals, the first signal line 13 and the second signal line 14 only require to be lines which allow electrical signals to flow.

Note that the control input signal and the control output signal may include many types. For example, the control input signal and the control output signal may have different forms such as an analog signal, a digital signal and a communication packet. Further, a plurality of first signal lines 13 and a plurality of second signal lines 14 may exist to transmit the control input signal and the control output signal having different forms.

The anomaly detection apparatus 15 is an apparatus which detects an anomaly of the control apparatus 11. It is assumed in the present embodiment that the control apparatus 11 has already had an anomaly by having been attacked. The anomaly detection apparatus 15 detects an anomaly of the control apparatus 11 by confirming the control output signal.

Specifically, the anomaly detection apparatus 15 learns relationship between the control input signal and the control output signal on the basis of at least the control input signal and the control output signal when the control apparatus 11 is normal. The learning is performed on a model to be used in machine learning, and a parameter of the model is made to approximate an appropriate value through the learning. After learning, the control output signal is estimated using the model. Then, the estimated control output signal is compared with the control output signal which is actually acquired, and whether or not an anomaly occurs at the control apparatus 11 is determined from a degree of divergence between the estimated control output signal and the acquired control output signal. Hereinafter, the model will be described as an estimation model.

Thus, the anomaly detection apparatus 15 acquires the control input signal and the control output signal. The example in FIG. 1 illustrates a configuration where the anomaly detection apparatus 15 can intercept the control input signal and the control output signal, and the anomaly detection apparatus 15 acquires the control input signal via the first signal line 13 and acquires the control output signal via the second signal line 14. In the control system 1, the control input signal is often transmitted through broadcasting or multicasting, in which case, the control input signal can be detected by monitoring the first signal line through which the control input signal flows. Further, in recent years, a port called a mirror port is often provided at a network switch, and the anomaly detection apparatus 15 can also detect the control input signal to be transmitted to the control apparatus 11 through unicasting by receiving a signal copied via the mirror port.

Figure 2:
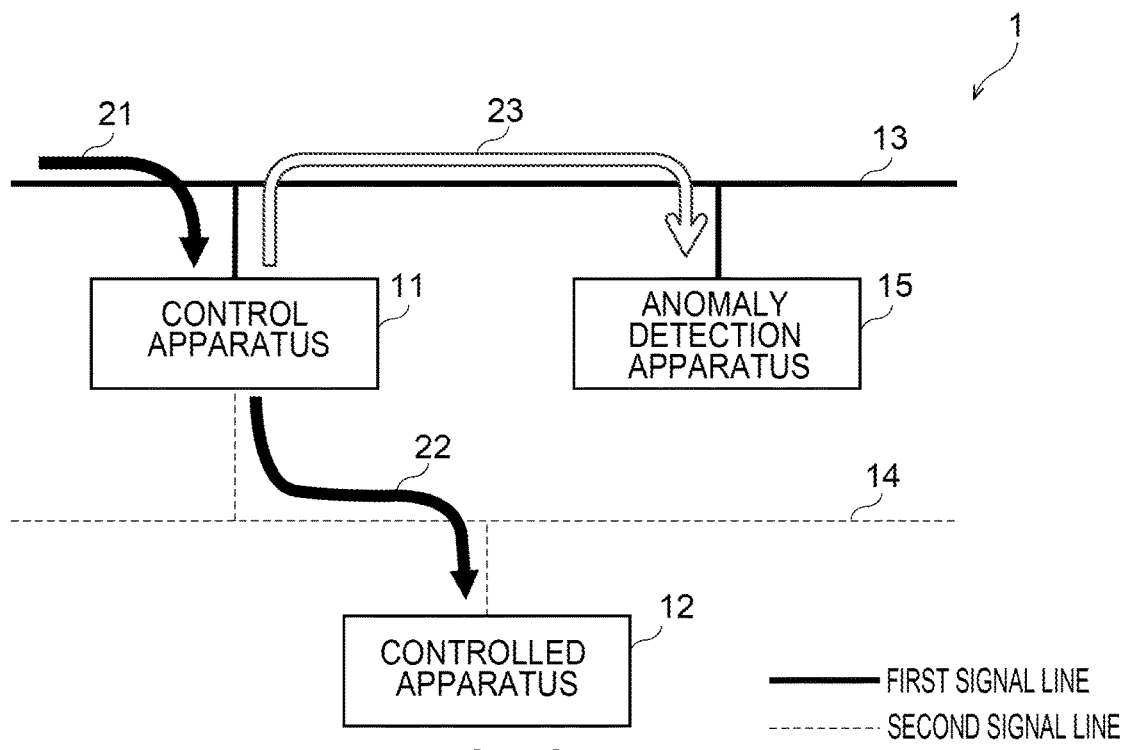
FIG. 2 is a view illustrating another example of connection of an anomaly detection apparatus.

However, the control input signal and the control output signal do not have to be able to be intercepted. FIG. 2 is a view illustrating another example of connection of the anomaly detection apparatus 15. In the example in FIG. 2, the anomaly detection apparatus 15 is not connected to the second signal line and cannot intercept the control output signal. However, as indicated with an arrow 23, the control apparatus 11 can transmit information to the anomaly detection apparatus 15. In other words, the anomaly detection apparatus 15 can acquire information regarding the control input signal and the control output signal from the control apparatus 11. In a case where the control apparatus 11 transmits the control input signal and the control output signal to the anomaly detection apparatus 15, it is only necessary to provide one signal line which connects the control apparatus 11 and the anomaly detection apparatus 15. Unlike with FIG. 1, a signal line which connects the control apparatus 11 and the anomaly detection apparatus 15 does not have to be the first signal line which transmits the control input signal. In this manner, connection of the anomaly detection apparatus 15 is not limited to the configuration in FIG. 1. However, the configuration in FIG. 1 in which the control input signal and the control output signal can be intercepted, is preferable because processing to be performed by the control apparatus 11 on the anomaly detection apparatus 15 can be reduced.

Figure 3:
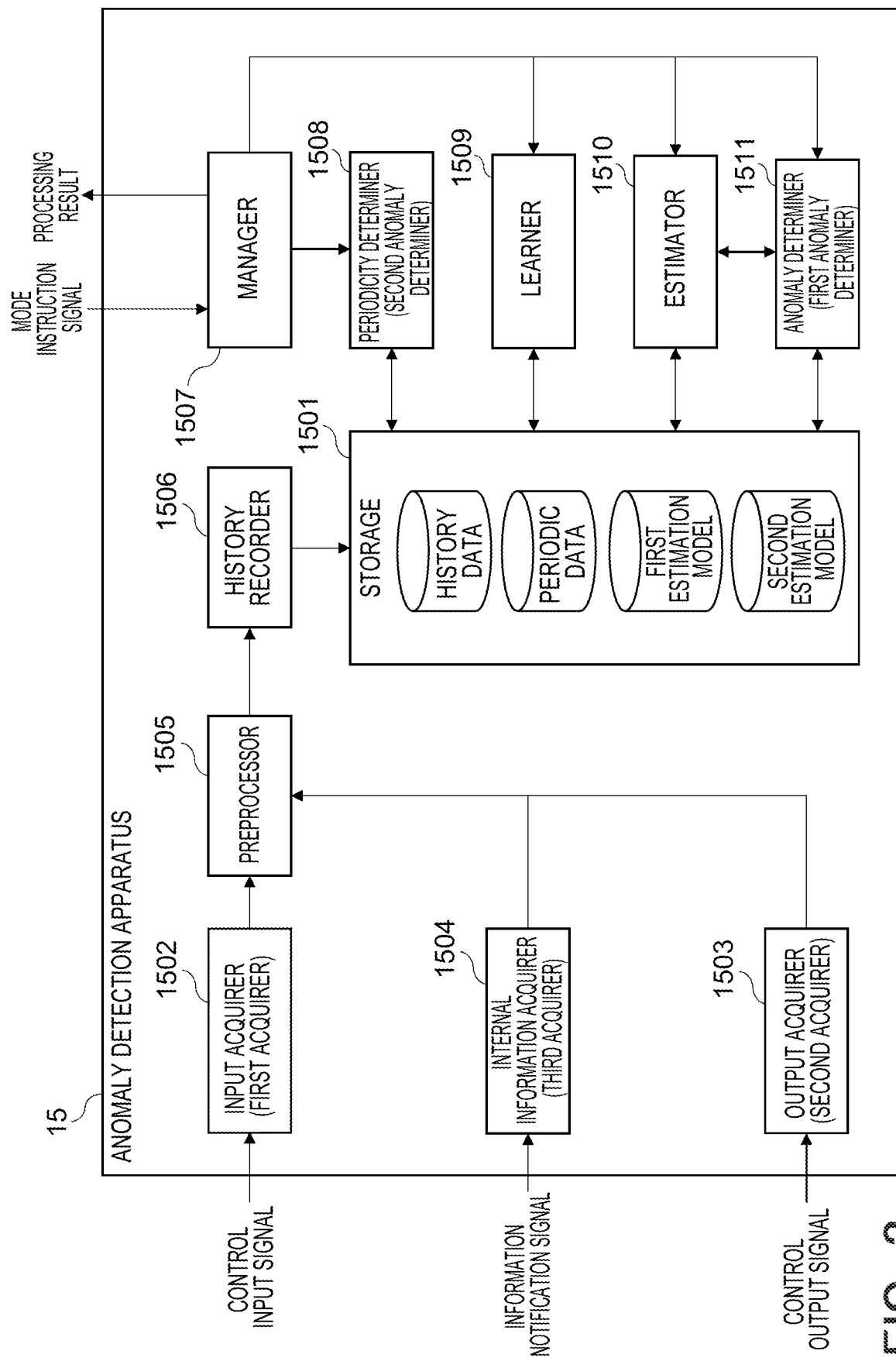
FIG. 3 is a block diagram illustrating a configuration example of the anomaly detection apparatus.

Details of processing of the anomaly detection apparatus 15 will be described along with components. FIG. 3 is a block diagram illustrating a configuration example of the anomaly detection apparatus 15. The anomaly detection apparatus 15 includes a storage 1501, an input acquirer (first acquirer) 1502, an output acquirer (second acquirer) 1503, an internal information acquirer (third acquirer) 1504, a preprocessor 1505, a history recorder 1506, a manager 1507, a periodicity determiner (second anomaly determiner) 1508, a learner 1509, an estimator 1510, and an anomaly determiner (first anomaly determiner) 1511.

Note that respective components of the anomaly detection apparatus 15 illustrated in FIG. 1 may be subdivided or may be aggregated. Further, the anomaly detection apparatus 15 may include components which are not illustrated in FIG. 1. For example, the storage 1501 may be divided for each kind of data to be stored. Further, the preprocessor 1505 may be divided for each signal to be processed. For example, part of the components may be included in an apparatus different from the anomaly detection apparatus 15. In other words, the anomaly detection apparatus 15 may be constituted with a plurality of apparatuses. An apparatus is often divided into apparatuses which expertly perform respective kinds of processing in the information processing system to disperse processing load, maintain availability, or the like. In other words, the anomaly detection apparatus 15 may be an apparatus which operates alone or may be a client-server type apparatus which coordinates with a server on a communication network such as cloud.

The storage 1501 stores data to be used for processing of the anomaly detection apparatus 15, processing results of respective components, or the like. For example, the above-described estimation model and history data which will be described later are stored. Data to be stored by the storage 1501 is not particularly limited.

The input acquirer 1502 acquires the control input signal from a signal transmitted from the first signal line or the second signal line. The output acquirer 1503 acquires the control output signal from a signal transmitted from the first signal line or the second signal line. Note that in a case where the anomaly detection apparatus 15 receives the control input signal from the first signal line and receives the control output signal from the second signal line, the input acquirer 1502 may be connected to the first signal line, and the output acquirer 1503 may be connected to the second signal line. Alternatively, as illustrated in the example in FIG. 2, in a case where the anomaly detection apparatus 15 collectively receives the control input signal and the control output signal, the input acquirer 1502 may detect the control input signal from the collectively received signals, and the output acquirer 1503 may detect the control output signal from the collectively received signals. The signals can be detected on the basis of, for example, content of data indicated by the signals.

Note that the input acquirer 1502 and the output acquirer 1503 may perform processing treatment on the control input signal and the control output signal. For example, conversion such as A/D conversion may be performed on the control input signal and the control output signal.

Further, the input acquirer 1502 and the output acquirer 1503 may make an inquiry to the control apparatus 11 in a case where the control input signal and the control output signal cannot be detected. For example, a value of the control output signal is stored in an internal storage area called register within the control apparatus 11. Thus, the value of the control output signal may be acquired by transmitting a register read command such as AO and DO to the control apparatus 11.

The internal information acquirer 1504 acquires internal information of the control apparatus 11. The acquired internal information is used to improve accuracy of anomaly detection. Thus, the internal information is preferably information regarding control. For example, information regarding computation for generating the control output signal from the control input signal is assumed as the internal information. For example, information regarding ladder logic of the control apparatus 11 can be considered as the information regarding computation.

Note that information to be used for computation such as ladder logic is stored in the register inside the control apparatus and sometimes cannot be acquired only by passively monitoring communication. Thus, the control apparatus 11 may transmit the internal information to the internal information acquirer 1504. Note that the internal information may be transmitted at regular intervals or may be transmitted in a case where there is a change in the internal information. Alternatively, the internal information acquirer 1504 may acquire the internal information by transmitting a register read command to the control apparatus 11 and receiving a response to the read command. Hereinafter, a signal indicating the internal information to be transmitted from the control apparatus 11 to the anomaly detection apparatus 15 will be described as an information notification signal.

Note that there are normally a plurality of registers, and the registers are distinguished using identification information called address or tag. Thus, identification information of the registers in which control to be performed is registered may be prepared, and information may be obtained only from the register using the identification information or information may be acquired from all the registers and then, control to be performed may be detected.

The preprocessor 1505 performs predetermined processing treatment on information indicated by the control input signal, information indicated by the control output signal and information indicated by the information notification signal. These kinds of processing treatment are preprocessing for inputting the information to the above-described estimation model. In other words, the preprocessor 1505 changes a form of the information to a form which can be input to the estimation model. While the preprocessing is typically processing such as standardization, the preprocessing to be performed is not particularly limited. Further, preprocessing to be executed on respective kinds of information does not have to be the same.

The history recorder 1506 accumulates data from the preprocessor 1505 in the storage 1501 as history data. FIG. 4 is a view illustrating an example of the history data. The data from the preprocessor 1505 includes information regarding the control input signal, the control output signal, and the information notification signal, which are recorded while a field of "type", or the like, is provided so as to be able to distinguish among these kinds of information in the history data. In the example in FIG. 4, rows with "packet (write)" in the field of "type" indicate records regarding the control input signal, rows with "AO" or "DO" in the field of "type" indicate records regarding the control output signal, and rows with "internal information" in the field of "type" indicate records regarding the information notification signal. Further, the example in FIG. 4 includes a field of "input/output time" indicating time at which each signal is input or output, a field of "address/port" indicating a port at which each signal is input/output or address at which information of each signal is recorded, a field of "input/output value" indicating a value of information indicated by each signal, or the like.

Further, an output interval of the control output signal is described in a field of "previous interval" illustrated in FIG. 4. Note that in a case where values in the "type" and the "address/port" are the same, it is determined that the signals are the same control output signal. While there are a control output signal with a "type" of "AO" and a control output signal with a "type" of "DO" in the example in FIG. 4, these signals are dealt with as different signals. In the example in FIG. 4, it is recorded that the control output signal with the "address/port" of "1" and with the "type" of "AO" is output at time "10:00:01", "10:00:11" and "10:00:21". There is no previous output, and thus, "no data" is described in a field of "previous interval" in the record of "10:00:01". In records of "10:00:11" and "10:00:21", an elapsed period of "00:00:10" from the previous time is described in the field of "previous interval". In a similar manner, the control output signal with "address/port" of "2" and with "type" of "DO" is output at time "10:00:04", "10:00:24" and "10:00:26". Thus, "no data", "00:00:20" and "00:00:02" are described in the field of "previous interval" of the respective records. In a typical control system, there can be a case where if a signal regarding control is received once, the control output signal is periodically output as a pulse signal. In such a case, an elapsed period from when the control apparatus 11 performs output previous time until when the control apparatus 11 performs output this time, that is, a pulse generation interval may be recorded, and normality of the pulse generation interval may be determined.

Further, whether the control output signal is periodical is described in a field of "periodic flag" illustrated in FIG. 4. Periodicity is not determined upon generation of the history data, and thus, "undetermined" is described in the example in FIG. 4.

The manager 1507 manages a processing mode of the anomaly detection apparatus 15. It is assumed that the processing mode includes at least three modes of "data collection", "estimation model generation" and "anomaly detection". Processing to be performed by the anomaly detection apparatus 15 changes depending on which of these modes is selected.

The mode may be selected by the manager 1507 on the basis of a predetermined condition or may be selected on the basis of a signal indicating a mode from an external apparatus. The predetermined condition can be a condition in which, for example, the number of pieces of history (the number of records) included in the history data exceeds a predetermined number, in which case, it is determined that the number of pieces of history sufficient to perform learning is secured, and learning for the estimation model is started. Further, for example, in a case where the number of times of learning exceeds a predetermined number, it is regarded that learning of the estimation model has been completed, and processing of anomaly detection may be performed on the subsequent control output signal.

Further, the manager 1507 may perform not only receiving a signal indicating a mode change instruction or the like but also transmitting a signal. For example, in a case where an anomaly is detected, the manager 1507 may output an alert to a designated destination.

The periodicity determiner 1508 loads the history data and determines periodicity of the control output signal included in the history data. A certain amount of data is required to determine periodicity, and thus, determination is executed after control output signals of equal to or larger than a predetermined number are acquired.

Methods for determining whether or not output is periodic can include, for example, a method in which dispersion, standard deviation, a fluctuation coefficient, or the like, is calculated on the basis of "previous interval" in the history data, and in a case where the calculated result falls within a predetermined allowable range, it is determined that output is periodic. A determination result of periodicity is recorded in the history data by the history recorder 1506.

FIG. 5 is a view illustrating history data after periodicity determination. As illustrated in FIG. 5, in a case where it is determined that the output is periodic, description of "undetermined" in the field of "periodic flag" of the history data is changed to "Yes", and in a case where it is determined that the output is not periodic, the description is changed to "No".

Further, the periodicity determiner 1508 may further calculate a value regarding characteristics of periodicity in a case where it is determined that the output is periodic. The calculation result may be recorded by the history recorder 1506 as periodic data.

FIG. 6 is a view illustrating periodic data. In the example in FIG. 6, an average interval and an allowable error are calculated as the characteristics of periodicity. The allowable error may be calculated on the basis of, for example, a maximum value and a minimum value of an interval in the whole history data of a target signal. Alternatively, a predetermined rate of the average interval may be set as the allowable error. Alternatively, in a case where distribution of interval data conforms with normal distribution, a confidence interval may be calculated from specific reliability and set as the allowable error. Note that in the example in FIG. 6, 10% of the average interval is set as the allowable error.

Further, the periodicity determiner 1508 may determine an anomaly of the acquired control output signal on the basis of periodicity in the anomaly detection mode. In other words, anomaly determination based on periodicity may be performed other than the anomaly determination based on the estimation model described above. In this case, an anomaly is determined by determining whether output of the control output signal conforms with the periodicity in a case where the output of the control output signal has periodicity. For example, when the control output signal is detected, an interval may be calculated from time of previous output, and in a case where the calculated interval falls within an allowable range based on the average interval and the allowable error indicated in the periodic data, it may be determined that the control output signal is normal, and in a case where the calculated interval does not fall within the allowable range, it may be determined that the control output signal is abnormal.

The learner 1509 generates the estimation model by performing learning for the above-described estimation model in the estimation model generation mode. The history data is used in learning. For example, the learner 1509 uses data until a certain time point of the history data as input data to the estimation model and uses data regarding the control output signal which is output after the time point of the history data as correct data. Then, the parameter for the estimation model may be updated so as to eliminate a difference between a result obtained by inputting the input data to the estimation model and correct data. This enables estimation of the control output signal which can be acquired in the future from the control input signal and the control output signal acquired so far.

Note that, to improve estimation accuracy, information regarding computation for generating the control output signal from the control input signal is preferably input to the estimation model with information regarding the control input signal and the control output signal.

For example, machine learning is performed using data from "10:00:00" to "10:00:25" of the history data illustrated in FIG. 5 as input data and data of the control output signal at "10:00:26" after the data from "10:00:00" to "10:00:25" as correct data so as to be able to estimate the control output signal.

Note that in a case where deep learning is used, it is possible to utilize a model based on a deep neural network (DNN) such as a recurrent neural network (RNN) and a long short term memory (LSTM) network as the estimation model. Alternatively, it is also possible to utilize a state transition estimation model such as a hidden Markov model (HMM).

Further, the number of estimation models is not limited to one. For example, as described above, while the history data can include data having periodicity and data not having periodicity, an estimation model subjected to learning based on the data having periodicity and an estimation model subjected to learning based on the data not having periodicity may be separately generated. For example, in a case where a control output signal having periodicity and a control output signal not having periodicity are included, learning may be performed for an estimation model which estimates the control output signal having periodicity on the basis of the control output signal having periodicity, and learning may be performed for an estimation model which estimates the control output signal not having periodicity on the basis of the control output signal not having periodicity.

In addition, different estimation models may be used on the basis of a reception path of a signal. As described above, there may be a plurality of first signal lines 13 and a plurality of second signal lines 14, and types of the signal lines may be either communication signal lines or electrical signal lines. Thus, for example, different estimation models may be used between a pattern in which the control output signal is received via an electrical signal line and a case where the control output signal is received via a communication line. Further, different estimation models may be used among, for example, a pattern A in which both the control input signal and the control output signal are received via the communication signal line, a pattern B in which both the control input signal and the control output signal are received via the electrical signal line, a pattern C in which the control input signal is received via the communication signal line, and the control output signal is received via the electrical signal line, and a pattern D in which the control input signal is received via the electrical signal line, and the control output signal is received via the communication line. Further, different estimation models may be used depending on whether or not the signal has periodicity and depending on a reception path. By using different estimation models for each situation in this manner, improvement of accuracy of anomaly detection can be expected compared to a case where a single estimation model is used.

Anomaly detection is performed using the learned estimation model in the anomaly detection mode. Specifically, the estimator 1510 estimates the control output signal after a time point relating to the input data by inputting data included in the history data to the learned estimation model. Then, the anomaly determiner 1511 compares the actual control output signal after the time point relating to the input data with the estimated control output signal and determines that the signal is normal in a case where the divergence falls within an allowable range, and otherwise determines that the signal is abnormal. Note that in a case where the divergence falls within the allowable range, it may be regarded that the actual control output signal matches the estimated control output signal.

Note that control output signals at a plurality of time points can be estimated depending on algorithm of the estimation model. In other words, it is possible to estimate a control output signal at a second time point after a first time point as well as a control output signal at the first time point. Thus, an anomaly may be determined using estimated control output signals at a plurality of time points. For example, in a case where N (where N is an integer equal to or greater than 1) or more of the estimated control output signals at the plurality of time points selected in descending order of probability can be regarded as matching actual control output signals at a plurality of time points, it may be regarded that the signal is normal.

Figure 7:
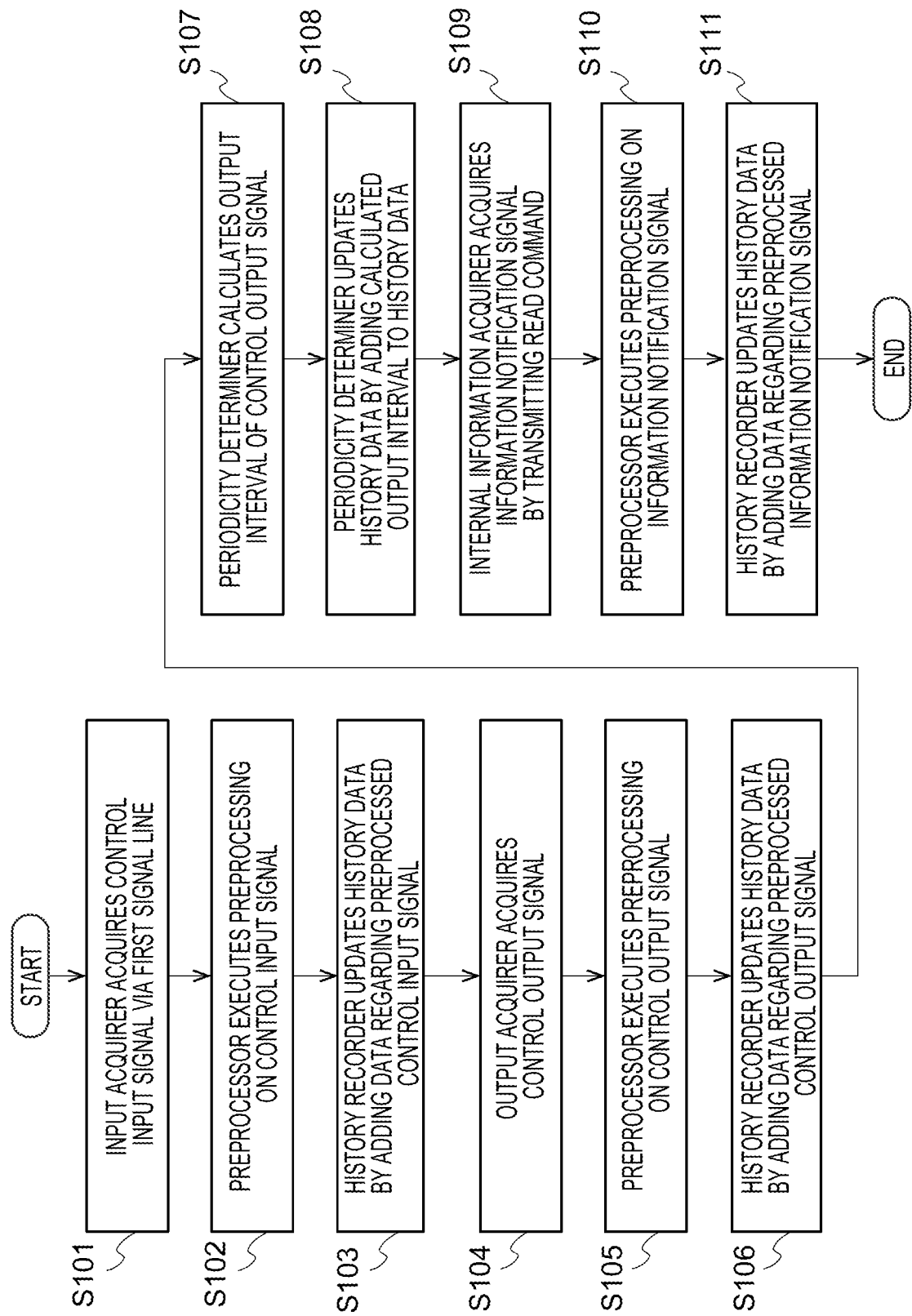
FIG. 7 is a schematic flowchart of processing in a data collection mode.
Figure 8:
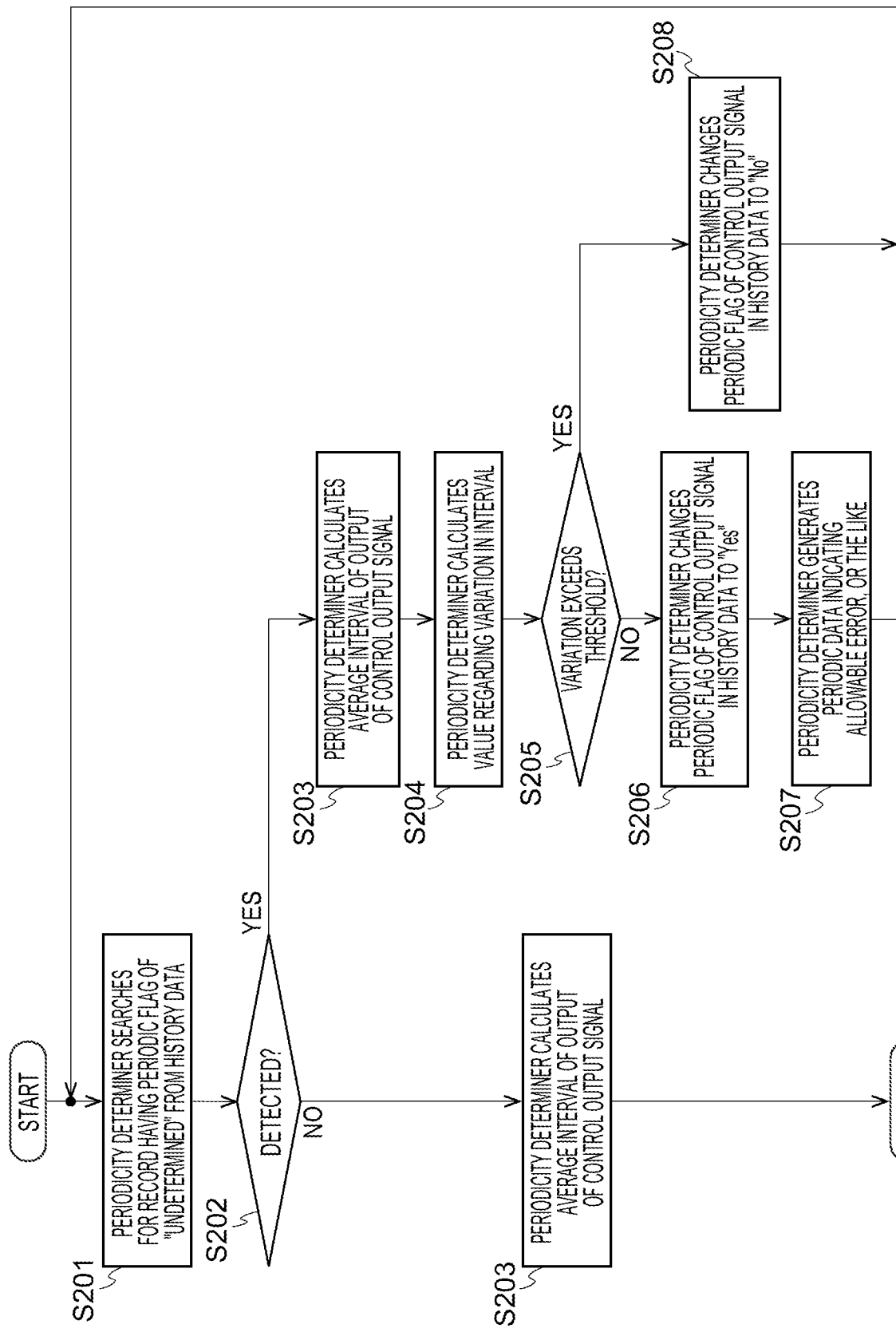
FIG. 8 is a schematic flowchart of processing in an estimation model generation mode.
Figure 9:
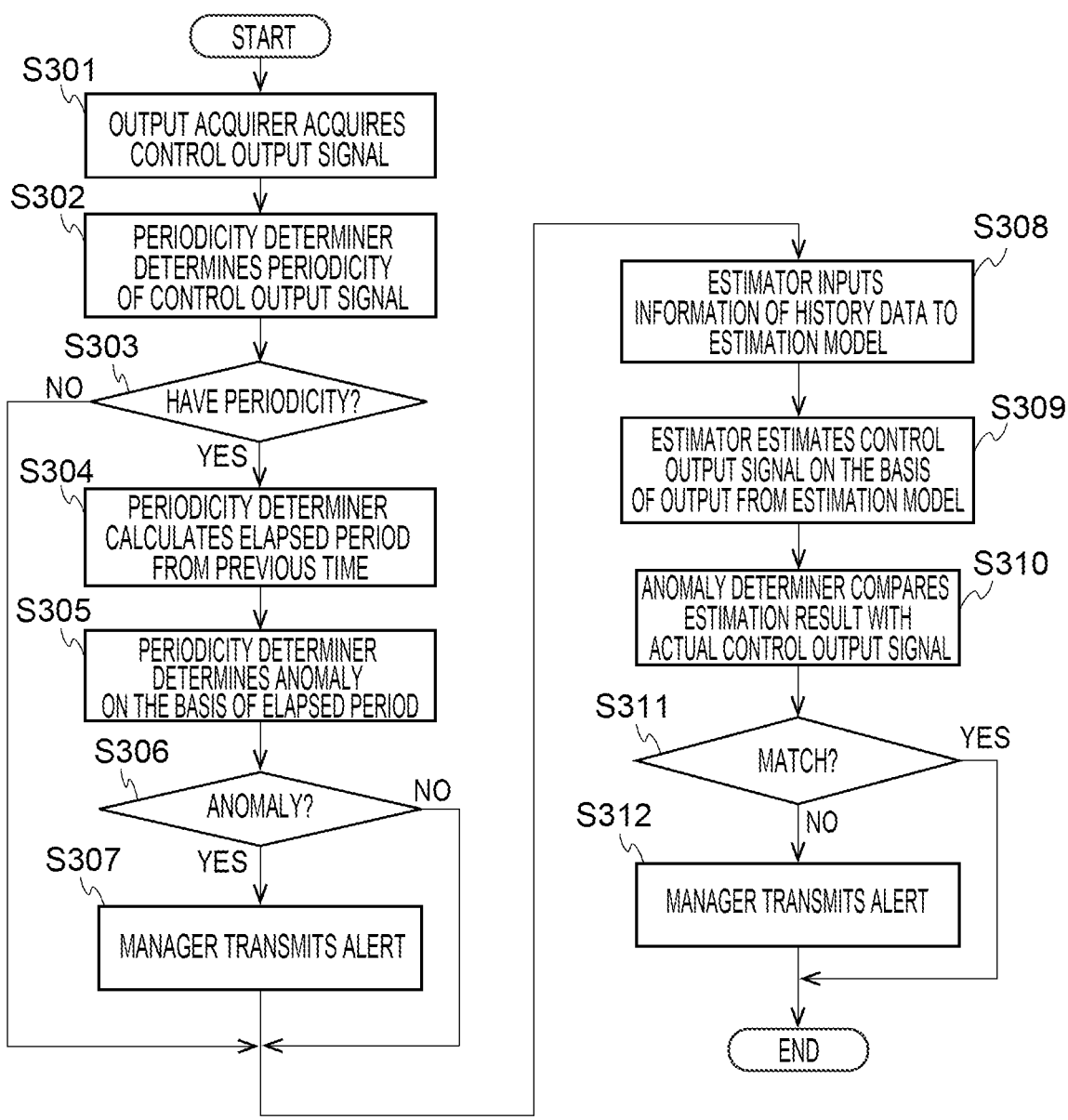
FIG. 9 is a schematic flowchart of processing in an anomaly detection mode.

Flow of processing of the respective components of the anomaly detection apparatus 15 will be described next. FIG. 7 to FIG. 9 illustrate processing flow in respective modes. Note that the flowchart in the present description is an example, and order of the flow may be replaced, or respective kinds of processing may be performed in parallel if the processing can be executed. For example, while acquisition of the control input signal, acquisition of the control output signal, calculation of an output interval and acquisition of the information notification signal will be described in a series of flow for explanatory convenience in the flowchart in FIG. 7, these kinds of processing may be performed independently of each other. Further, while the periodicity determiner 1508 performs processing both in the data collection mode and in the estimation model generation mode in the following description, the periodicity determiner 1508 may collectively perform processing in either mode, or a mode in which the periodicity determiner 1508 performs processing may be separately provided. The flow may be adjusted as appropriate in this manner.

FIG. 7 is a schematic flowchart of processing in the data collection mode. The input acquirer 1502 acquires the control input signal via the first signal line (S101). Note that the acquisition may be interception via the first signal line or may be transmission from the control apparatus 11 as described above. The preprocessor 1505 performs predetermined preprocessing on the acquired control input signal (S102). The history recorder 1506 updates the history data by adding data regarding the preprocessed control input signal (S103).

Then, the output acquirer 1503 acquires the control output signal via the second signal line (S104). Note that the acquisition may be interception via the second signal line or transmission from the control apparatus 11 as described above. The preprocessor 1505 performs predetermined preprocessing on the control output signal (S105). The history recorder 1506 updates the history data by adding data regarding the preprocessed control output signal (S106).

Then, the periodicity determiner 1508 loads the history data, distinguishes the control output signal on the basis of values of items such as the "type" and the "address/port" and calculates an output interval of the control output signal (S107). Then, the periodicity determiner 1508 updates the history data by adding the calculated output interval to the history data (S108). Subsequently, the internal information acquirer 1504 acquires the information notification signal by transmitting a read command to the control apparatus 11 (S109). The preprocessor 1505 performs predetermined preprocessing on the information notification signal (S110). Then, the history recorder 1506 updates the history data by adding data regarding the preprocessed information notification signal (S111). In this manner, the history data including information regarding the control input signal, the control output signal and the internal information as illustrated in FIG. 5 is generated.

FIG. 8 is a schematic flowchart of processing in the estimation model generation mode. The periodicity determiner 1508 loads the history data and searches for a record with the periodic flag of "undetermined" as illustrated in FIG. 4 (S201). In a case where the record is detected (S202: Yes), the periodicity determiner 1508 distinguishes the control output signal on the basis of values of items such as the "type" and the "address/port" and calculates an average interval on the basis of values of the "previous interval" of the respective control output signals (S203). Further, the periodicity determiner 1508 calculates a value regarding variation in the interval such as dispersion, standard deviation and a fluctuation coefficient (S204). In a case where the value does not exceed a predetermined threshold (S205: No), the periodicity determiner 1508 determines that the control output signal has periodicity and changes the periodic flag of the record regarding the control output signal in the history data to "Yes" (S206). The periodicity determiner 1508 further calculates an allowable error using a predetermined method and generates periodic data indicating information such as an allowable error, an average interval, a port and address (S207). By this means, an allowable range is determined, and the flow returns to the processing in S201.

On the other hand, in a case where the value regarding variation in the interval exceeds the predetermined threshold (S205: Yes), it is not determined that the control output signal has periodicity, and the periodicity determiner 1508 changes the periodic flag in the history data to "No" (S208). Then, the flow returns to the processing in S201.

In this manner, records with the periodic flag of "undetermined" decrease, and in a case where there is no record with the periodic flag of "undetermined" (S202: No), the learner 1509 executes learning for the estimation model on the basis of the history data (S209). As a result of learning proceeding in this manner, and the present flow being repeated, learning is completed.

FIG. 9 is a schematic flowchart of processing in the anomaly detection mode. Note that also in the anomaly detection mode, the data is added to the history data in a similar manner to the data collection mode in a case where the control output signal, or the like, is received. Flow of the processing is the same as the flow in the data collection mode, and thus, the flow will be omitted, and it is assumed that the history data is updated to the latest data.

The output acquirer 1503 acquires the control output signal (S301), the periodicity determiner 1508 determines periodicity of the acquired control output signal using the periodic data (S302). In a case where the control output signal does not have periodicity (S303: No), anomaly determination based on periodicity is not performed, and the processing transitions to processing in S308. In a case where the control output signal has periodicity (S303: Yes), the periodicity determiner 1508 calculates an elapsed period (interval) from the previous output (S304) and determines an anomaly of the control apparatus 11 on the basis of whether or not the calculated elapsed period falls within the allowable range calculated in the estimation model generation mode (S305).

In a case where it is not determined that the control apparatus 11 has an anomaly (S306: No), the processing transitions to processing in S308. In a case where it is determined that the control apparatus 11 has an anomaly (S306: Yes), the manager 1507 determines that the periodicity is abnormal and outputs an alert to a designated destination (S307), and the processing transitions to the processing in S308. The designated destination is not particularly limited. The designated destination may be a management terminal which transmits a signal for switching a mode to the anomaly detection apparatus 15 or equipment such as a warning light. Further, while in the present flow, anomaly determination based on the estimation model is also performed after anomaly determination based on periodicity, in a case where it is determined that the control apparatus 11 has an anomaly after anomaly determination based on periodicity, the flow may be finished after the processing in S307.

The estimator 1510 inputs information of the updated history data to the estimation model (S308) and estimates the control output signal on the basis of an output result from the estimation model (S309). However, information regarding the control output signal acquired in the processing in S301 is not input. The information is used to be compared with the estimation result. Then, the anomaly determiner 1511 compares the estimation result with the control output signal acquired in the processing in S301 and determines whether the control output signal can be regarded as matching the estimation result (S310). In a case where the control output signal can be regarded as matching the estimation result (S311: Yes), the anomaly determiner 1511 determines that the control apparatus 11 is normal and finishes the flow. In a case where the control output signal does not match the estimation result (S311: No), it is determined that the control apparatus 11 has an anomaly, and the manager 1507 outputs an alert for warning the anomaly to the designated destination (S312) and finishes the flow. Note that an output destination of the alert may be different between the processing in S307 and the processing in S312.

As described above, the anomaly detection apparatus 15 of the present embodiment learns relationship among input to the control apparatus 11, the internal information of the control apparatus 11 and output from the control apparatus 11 on the basis of the input to the control apparatus 11, the internal information of the control apparatus 11 and the output from the control apparatus 11 at a time point at which the control apparatus 11 is normal. Then, the anomaly detection apparatus 15 determines whether the control apparatus 11 correctly operates by determining whether the relationship deviates. By this means, it is possible to detect an anomaly which could not be detected with a security product such as an IDS in related art and protect the control system 1 against various cyberattacks.

Note that while in the present embodiment, the anomaly detection apparatus 15 is one apparatus, the anomaly detection apparatus 15 may be constituted with a plurality of apparatuses. For example, the anomaly detection apparatus 15 may be separated into an apparatus which collects history data for learning, an apparatus which executes learning of an estimation model for detecting an anomaly and an apparatus which detects an anomaly using the estimation model.

Second Embodiment

It is assumed in the first embodiment that the control output signal is falsified, that is, control to be performed on the controlled apparatus 12 is falsified. Further, in recent years, there is an attack which makes it appear as if the control apparatus 11 is normal even if an anomaly occurs at the control apparatus 11, or inversely, an attack which makes it appear as if the control apparatus 11 has an anomaly even if an anomaly does not occur. Such attacks falsify a signal which notifies a state of the control apparatus 11. Hereinafter, the signal will be described as a state notification signal.

Figure 10:
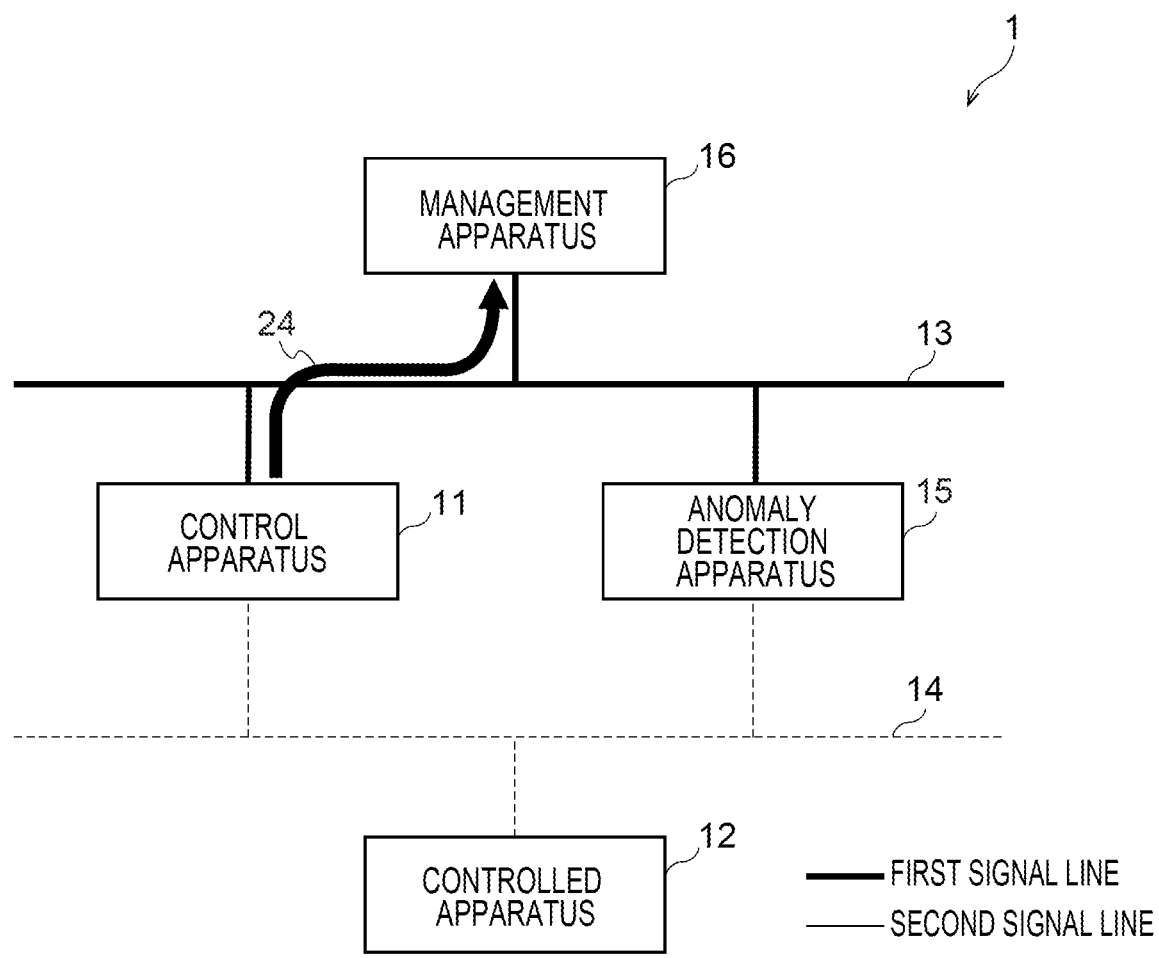
FIG. 10 is a view explaining a path of a state notification signal.

FIG. 10 is a view explaining a path of the state notification signal. In the example in FIG. 10, a management apparatus 16 is added to the control system 1 illustrated in FIG. 1. A human machine interface (HMI), or the like, for confirming a state of the control apparatus 11 is assumed as the management apparatus 16. As indicated with an arrow 23, the state notification signal flows from the control apparatus 11 to the management apparatus 16.

It is assumed in the present embodiment that the control apparatus 11 is attacked, and the state notification signal is falsified. Thus, the anomaly detection apparatus 15 detects an anomaly of the control apparatus 11 by confirming whether the state notification signal has an anomaly. Note that falsification of the state notification signal may be detected while falsification of the control output signal is detected in a similar manner to the first embodiment.

Components in the second embodiment may be similar to the components in the first embodiment. Thus, FIG. 1 may be also used as a configuration diagram of the second embodiment. However, the output acquirer 1503 acquires the state notification signal in place of or in addition to the control output signal. Alternatively, an acquirer which acquires the state notification signal may be provided separately from the output acquirer 1503 which acquires the control output signal. Further, a preprocessing method to be performed on the state notification signal is determined in advance so that the preprocessor 1505 can execute preprocessing also on the state notification signal.

Further, computation is not performed to generate the state notification signal from the control input signal, and thus, it is not necessary to acquire internal information. In a case where only anomaly detection based on the state notification signal is performed and anomaly detection based on the control output signal is not performed, the internal information acquirer 1504 may be omitted.

FIGS. 11A and 11B are views illustrating history data and periodic data when the state notification signal is acquired. In the history data in the example in FIG. 11A, information regarding the state notification signal is described separately from information regarding the control output signal. The information regarding the detected state notification signal is expressed as "Packet(Read)". Further, most of the control input signals for the state notification signal are signals such as AI and DI from a sensor, a switch, or the like, and thus, "AI" is described in history data in the example of FIG. 11A. Further, information regarding the internal information is not included. Items of the history data are similar to the items of the history data in the first embodiment although values, or the like, are different, and processing regarding the history data may be similar to the processing in the first embodiment. Items of periodic data in the example in FIG. 11(B) are also the same as the periodic data in the first embodiment illustrated in FIG. 6, and processing regarding the history data may be similar to the processing in the first embodiment.

The periodicity determiner 1508 and the learner 1509 perform processing in a similar manner to the first embodiment except that the periodicity determiner 1508 and the learner 1509 use history data regarding the state notification signal. Further, the estimator 1510 and the anomaly determiner 1511 perform processing in a similar manner to the first embodiment except that the estimator 1510 and the anomaly determiner 1511 use the state notification signal in place of the control output signal. In other words, it is possible to estimate the state notification signal using an estimation model generated on the basis of the history data regarding the state notification signal and determine an anomaly by comparing the estimated state notification signal with an actual state notification signal. Further, different estimation models of the state notification signal may be used in accordance with periodicity, a reception path, or the like, in a similar manner to the first embodiment.

A flowchart in the second embodiment may be similar to the flowchart in the first embodiment, and it is only necessary to read the control output signal as the state notification signal.

As described above, it is possible to detect falsification of the state notification signal by targeting at the state notification signal in a similar manner to the control output signal.

Note that at least part of the above-described embodiments may be implemented with a dedicated electronic circuit (that is, hardware) such as an integrated circuit (IC) in which a processor, a memory, and the like, are mounted. Further, at least part of the above-described embodiments may be implemented by executing software (programs). For example, it is possible to implement processing of the above-described embodiments by using a general-purpose computer apparatus as basic hardware and causing a processor such as a CPU mounted on the computer apparatus to execute the programs.

For example, the apparatus of the above-described embodiments can be implemented as a computer by the computer reading out dedicated software stored in a computer-readable storage medium. A type of the storage medium is not particularly limited. Further, the apparatus of the above-described embodiments can be implemented as a computer by the computer installing dedicated software downloaded via a communication network. In this manner, information processing using software is specifically implemented using hardware resources.

Figure 12:
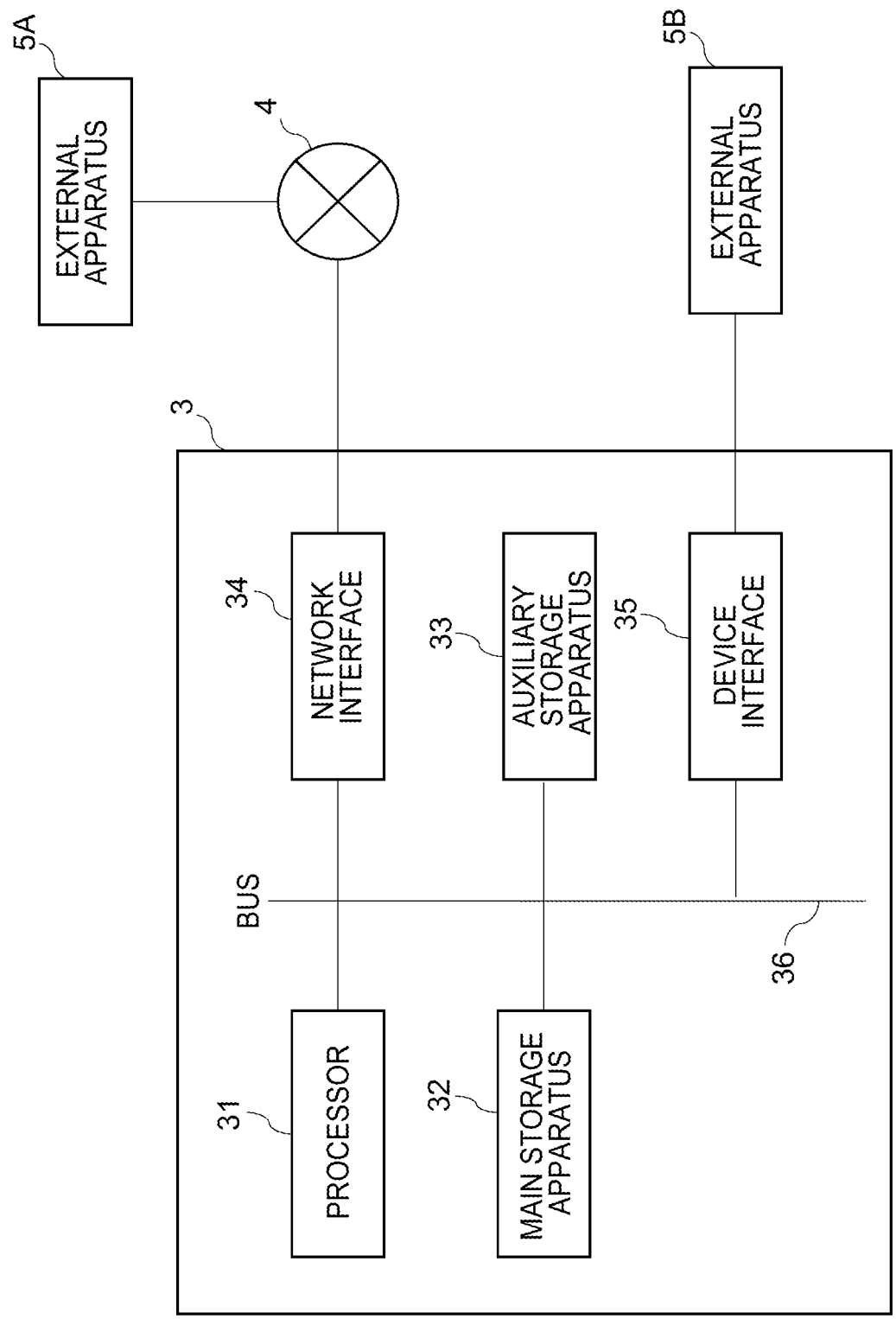
FIG. 12 is a block diagram illustrating an example of a hardware configuration in one embodiment of the present invention.

FIG. 12 is a block diagram illustrating an example of a hardware configuration in one embodiment of the present invention. The anomaly detection apparatus 15 includes a processor 31, a main storage apparatus 32, an auxiliary storage apparatus 33, a network interface 34 and a device interface 35, and can be implemented as a computer apparatus 3 in which these are connected via a bus 36. The storage 1501 can be implemented by the main storage apparatus 32 or the auxiliary storage apparatus 33, and components other than the storage 1501 can be implemented by the processor 31.

Note that while the computer apparatus 3 in FIG. 12 includes components one each, the computer apparatus 3 may include a plurality of the same components. Further, while FIG. 12 illustrates one computer apparatus 3, software may be installed at a plurality of computer apparatuses, and each of the plurality of computer apparatuses may execute different part of processing of the software.

The processor 31 is an electronic circuit including the control apparatus 11 and a computation apparatus of the computer. The processor 31 performs computation processing on the basis of data and a program input from each apparatus, or the like, of an internal configuration of the computer apparatus 3 and outputs a computation result and a control signal to each apparatus, or the like. Specifically, the processor 31 controls respective components constituting the computer apparatus 3 by executing an operating system (OS) of the computer apparatus 3, application, or the like. The processor 31 is not particularly limited, if the processor 31 can perform the above-described processing.

The main storage apparatus 32 is a storage apparatus which stores a command to be executed by the processor 31, various kinds of data, or the like, and information stored in the main storage apparatus 32 is directly read out by the processor 31. The auxiliary storage apparatus 33 is a storage apparatus other than the main storage apparatus 32. Note that these storage apparatuses mean arbitrary electronic parts in which electronic information can be stored and may be either a memory or a storage. Further, while the memory includes a volatile memory and a non-volatile memory, either one may be used.

The network interface 34 is an interface for connecting to the communication network 4 in a wireless or wired manner. As the network interface 34, it is possible to use one complying with existing communication standards. Information may be exchanged with an external apparatus 5A which is communicatively connected via the communication network 4 using the network interface 34.

The device interface 35 is an interface such as a USB which directly connects to an external apparatus 5B. The external apparatus 5B may be either an external storage medium or a storage apparatus such as a database.

The external apparatuses 5A and 5B may be output apparatuses. The output apparatus may be, for example, a display apparatus which displays an image or an apparatus which outputs speech, or the like. For example, the output apparatus includes, but not limited to a liquid crystal display (LCD), a cathode ray tube (CRT), a plasma display panel (PDP), a speaker.

Note that the external apparatuses 5A and 5B may be input apparatuses. The input apparatus includes a device such as a keyboard, a mouse, a touch panel, and provides information input through these devices to the computer apparatus 3. A signal from the input apparatus is output to the processor 31.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An anomaly detection apparatus comprising:
processing circuitry configured to:
acquire an input signal to a control apparatus which executes control on a controlled apparatus;
acquire an output signal from the control apparatus;
record information regarding the acquired input signal and the acquired output signal as history;
estimate the output signal using the history and an estimation model;
determine an anomaly of the control apparatus by comparing the estimated output signal with the acquired output signal; and
acquire information regarding computation for generating the control output signal from the control input signal, wherein
the control output signal indicating the control to be performed is estimated as the output signal at a time point after a time point relating to data which is input to an estimation model based on a neural network by inputting data based on the history and information regarding computation to the estimation model;
the control input signal regarding execution of the control is acquired as the input signal;
the control output signal is acquired as the output signal;
an anomaly of the control apparatus is determined by comparing the estimated control output signal with the acquired control output signal;
the information regarding the computation is recorded in the history; and
the information regarding the computation is acquired by transmitting a read command for a register of the control apparatus, to the control apparatus.

2. The anomaly detection apparatus according to claim 1, wherein a time at which the output signal is output is recorded in the history, and
the processing circuitry is further configured to determine periodicity of the output signal on a basis of the time at which the output signal is output and determine an anomaly on a basis of an output interval of the output signal in a case where it is determined that the output signal has periodicity.

3. The anomaly detection apparatus according to claim 2, wherein an allowable range for the output interval is determined on a basis of the output interval of the output signal in a case where it is determined that the output signal has periodicity, and
in a case where an output signal of an output interval which does not fall within the allowable range is detected, determines that the control apparatus has an anomaly.

4. An anomaly detection apparatus comprising:
processing circuitry configured to:
acquire an input signal to a control apparatus which executes control on a controlled apparatus;
acquire an output signal from the control apparatus;
record information regarding the acquired input signal and the acquired output signal as history;
estimate the output signal using the history and an estimation model;
determine an anomaly of the control apparatus by comparing the estimated output signal with the acquired output signal; and
perform machine learning for the estimation model using data of part of the history as input data to the estimation model and using data regarding the output signal which is temporally after the input data in the history as correct data, wherein
the output signal at a time point after a time point relating to data which is input to an estimation model is estimated by inputting the data based on the history to the estimation model based on a neural network,
in a case where the output signal includes a first output signal having periodicity, and a second output signal not having periodicity,
data for the first output signal in the history is used to perform learning for a first estimation model and uses data for the second output signal in the history to perform learning for a second estimation model, and
the first output signal is estimated by using the first estimation model and the second output signal is estimated by using the second estimation model.

5. The anomaly detection apparatus according to claim 4, wherein in a case where the output signal includes a third output signal to be transmitted via a first signal line connected to the control apparatus, and a fourth output signal to be transmitted via a second signal line connected to the control apparatus,
data for the third output signal in the history is used to perform learning for a third estimation model and data for the fourth output signal in the history is used to perform learning for a fourth estimation model, and
the third output signal is estimated using the third estimation model and the fourth output signal is estimated using the fourth estimation model.

6. An anomaly detection apparatus comprising:
processing circuitry configured to:
acquire an input signal to a control apparatus which executes control on a controlled apparatus;
acquire an output signal from the control apparatus;
record information regarding the acquired input signal and the acquired output signal as history;
estimate the output signal using the history and an estimation model; and
determine an anomaly of the control apparatus by comparing the estimated output signal with the acquired output signal, wherein
a control input signal indicating information regarding execution of control on the controlled apparatus is acquired as the input signal,
a state notification signal indicating a state of the control apparatus is acquired as the output signal,
the state notification signal is estimated as the output signal, and
an anomaly of the control apparatus is determined by comparing the estimated state notification signal with the acquired state notification signal.

7. An anomaly detection method comprising:
acquiring an input signal to a control apparatus which executes control on a controlled apparatus;
acquiring an output signal from the control apparatus;
recording information regarding the acquired input signal and the acquired output signal as history;
estimating the output signal using the history and an estimation model; and
determining an anomaly of the control apparatus by comparing the estimated output signal with the acquired output signal, wherein a control input signal indicating information regarding execution of control on the controlled apparatus is acquired as the input signal, a state notification signal indicating a state of the control apparatus is acquired as the output signal, the state notification signal is estimated as the output signal, and an anomaly of the control apparatus is determined by comparing the estimated state notification signal with the acquired state notification signal.

8. A non-transitory storage medium in which a program is stored, the program comprising:

acquiring an input signal to a control apparatus which executes control on a controlled apparatus;

acquiring an output signal from the control apparatus;

recording information regarding the acquired input signal and the acquired output signal as history;

estimating the output signal using the history and an estimation model; and determining an anomaly of the control apparatus by comparing the estimated output signal with the acquired output signal, wherein a control input signal indicating information regarding execution of control on the controlled apparatus is acquired as the input signal, a state notification signal indicating a state of the control apparatus is acquired as the output signal, the state notification signal is estimated as the output signal, and an anomaly of the control apparatus is determined by comparing the estimated state notification signal with the acquired state notification signal.

\* \* \* \* \*